Patented Dec. 31, 1946

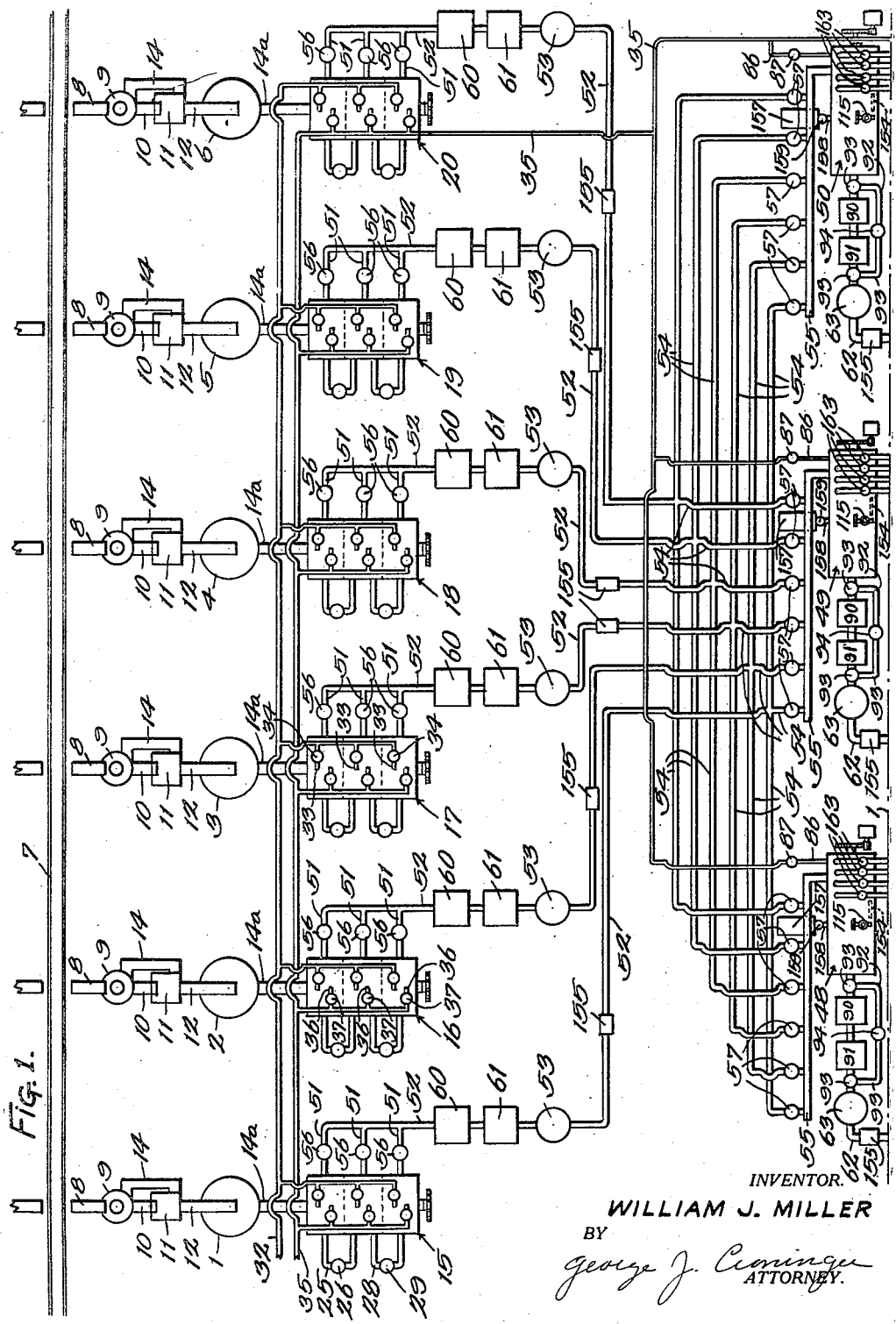
Dec. 31, 1946.  W. J. MILLER  2,413,330
APPARATUS FOR PREPARING MIXTURES OF CERAMIC MATERIALS
IN THE MANUFACTURE OF POTTERYWARE
Filed Aug. 13, 1942  3 Sheets-Sheet 1
INVENTOR.
WILLIAM J. MILLER
BY
ATTORNEY.

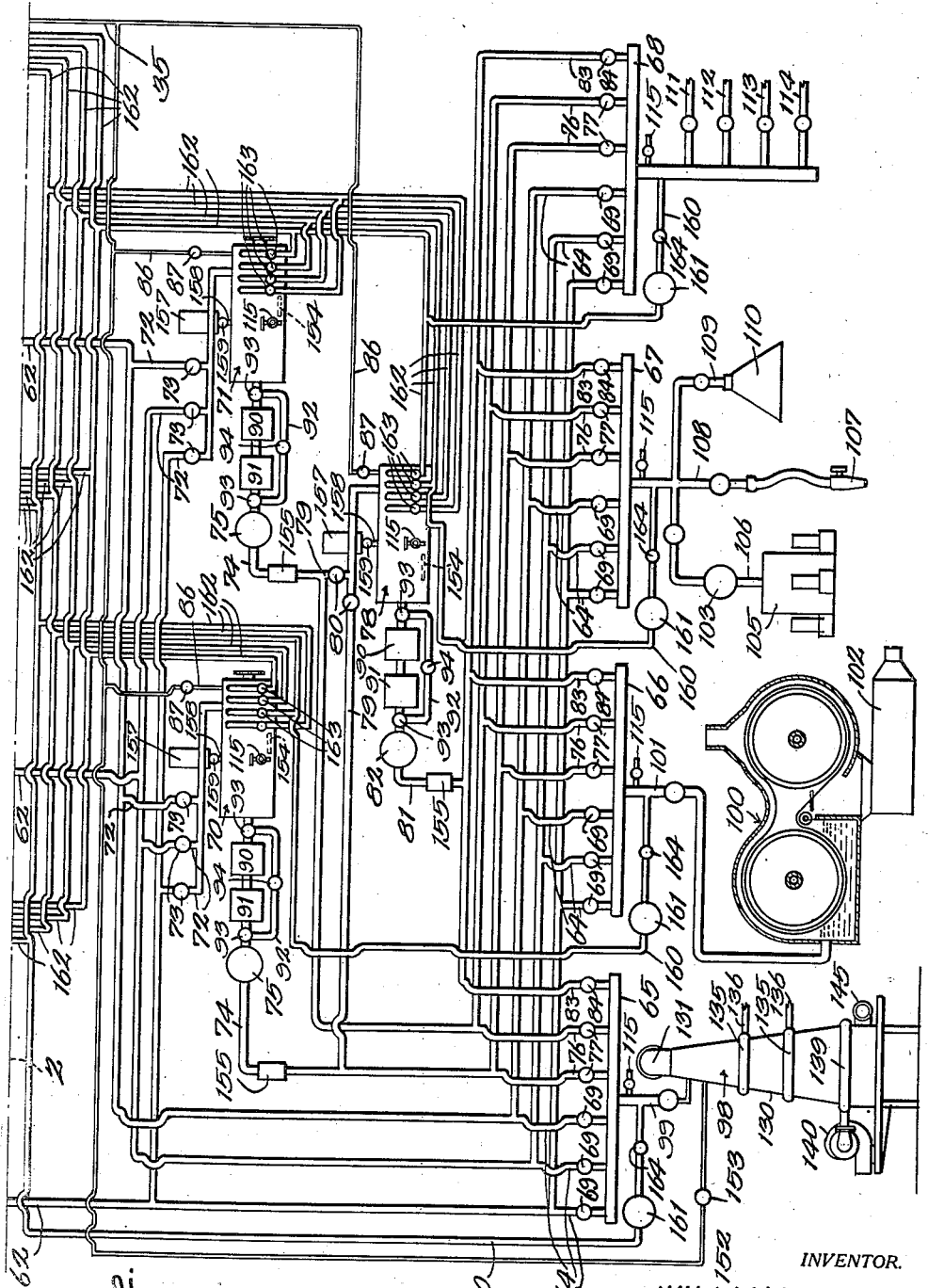

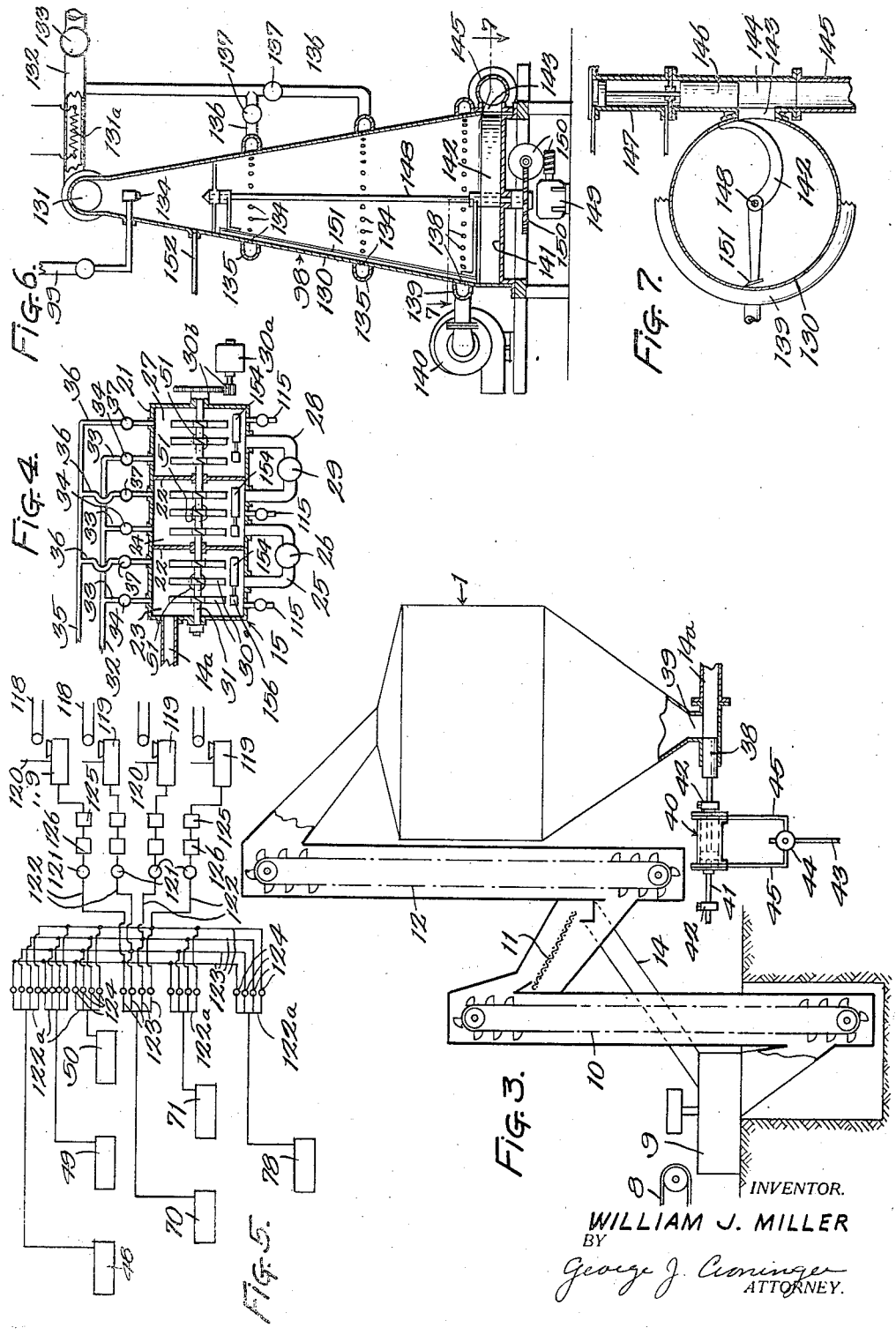

2,413,330

UNITED STATES PATENT OFFICE 2,413,330

APPARATUS FOR PREPARING MIXTURES OF CERAMIC MATERIALS IN THE MANUFACTURE OF POTTERY WARE

William J. Miller, Swissvale, Pa., assignor to Miller Pottery Engineering Company, Swissvale, Pittsburgh, Pa., a corporation of Pennsylvania Application August 13, 1942, Serial No. 454,716

15 Claims. (Cl. 25—1)

This invention relates to apparatus for preparing mixtures of ceramic materials used in the manufacture of vitreous, semi-vitreous or earthenware plates, cups and saucers and other forms of pottery ware. It has to do with a system particularly adapted for use with modern, high-speed mechanized pottery forming machinery although it is not necessarily limited thereto.

The various production departments of a pottery such as, for instance, the jiggering or casting departments are supplied with clay in plastic or fluid form that is mixed and conditioned in another department known as the "slip house." With the advent of mechanized production, it has been extremely difficult to obtain clay in the quantity and quality needed to maintain normal production speeds from a slip house manned and equipped to supply the needs of manual production.

One of the objects of this invention is to provide apparatus capable of supplying the clay requirements of a mechanized pottery.

Other objects are:

To provide for the simultaneous and continuous preparation of clay bodies of various compositions automatically, with the least amount of manual labor, from the sources of supply of the various plastic and non-plastic materials required to the clay receiving means of the various ware production lines of a pottery plant.

To provide for a more definite control over the proportioning and progressive blending and mixing of the various materials, as well as material selection and admixtures while the system is in operation.

To provide for the selection of the greatest number of clay body compositions for various types of ware and/or various ware production methods with the simplest possible control means in the shortest possible time.

To provide a selective method of blending procedure.

To provide for the modification or changing of a clay body or bodies while production subsists.

To provide such a system in which the blending, mixing, transportation, fluidifying, or dehydration of the clay bodies may be conducted under sub-atmospheric pressure to prevent air entrapment.

To provide for conditioning a multiple of clay compositions as to state of hydration, dehydration, or plasticity or fluidity simultaneously, and To provide such a system so enclosed and under controlled sub-atmospheric pressure whereby contamination of the materials during preparation by undesirable foreign matter or elements tending to hinder continuous production of predetermined quality and characteristic ware and/or preparation operation and/or the proper behavior of the prepared clay during fabrication and firing, will be effectively prevented, whereby the continuous production of a higher grade of ware of predetermined characteristics will be assured.

Other objects and advantages of the invention will be come apparent by reference to the specification and the accompanying drawings, in which:

Figs. 1 and 2 taken together to match on the division lines 1 and 2 of said figures, comprise a diagrammatic illustration of the entire system.

Fig. 3 is an enlarged diagrammatic sectional elevation of one of the material feeders and the apparatus for supplying same seen in Fig. 1.

Fig. 4 is a diagrammatic sectional view of one of the material slip preparing organizations of the system.

Fig. 5 is a diagrammatic illustration of apparatus of the system for salvaging scrap clay derived from ware fabricating apparatus supplied by the system.

Fig. 6 is a sectional elevation of the desiccator shown in Fig. 1.

Fig. 7 is a plan section of the desiccator as taken on the section line 7—7 of Fig. 6.

In carrying out the system, the raw plastic materials, such as ball clay, kaolin and china clays, and the non-plastic materials such as flint, feldspar and fluorspar may be stored in bins or hoppers 1, 2, 3, 4, 5 and 6, respectively, conveniently located in a pottery plant to be supplied from trucks or railroad cars on a rail siding 7 by way of conveyor means associated with each bin (see Fig. 1). As seen in Fig. 3, the raw material is transported to each bin by way of a conveyor 8 from which the material is discharged into a crusher 9 to be ground to the desired degree of fineness. From the crusher, the ground material is transported by an elevator 10 onto a screen 11 from which the screened material is transported by another elevator 12 into the bin or hopper, while the material failing to pass through the screen is directed back to the crusher by way of a chute 14 for further grinding. The screen may be of the inclined reciprocating type or it may be of the conical rotating type. From the bins, the various materials are conducted by way of conduits 14a (see Fig. 1) to blungers 15, 16, 17, 18, 19 and 20, respectively, in each of which the particular material is mixed with a predetermined volume of water at successive stages of its substantially continuous progression therethrough to form slips at said stages varying in viscosity and state of disintegration, and whereby selective continuous flow from the blunger of a certain slip or blended combination of two or more slips may be conducted to the clay preparation means later described. To this end, each of said blungers, as seen in Fig. 4, may comprise an enclosed elongated casing 21 provided with partitions 22 forming a primary mixing chamber 23 into which a predetermined amount of material is constantly flowed from its associated bin by way of the conduit 14a, a secondary mixing chamber 24 into which the material is conducted from the primary chamber, by way of an exterior conduit 25 controlled by a valve 26, and a tertiary mixing chamber 27 into which the material may be conducted from the secondary chamber by way of an exterior conduit 28 controlled by a valve 29. Mixing of the material in the chambers may be accomplished by the usual means such as by blades 20 on a central rotating shaft 31 extending through the casing 21 and driven by a motor 30a through reduction gearing 30b, while water is supplied to the chambers in predetermined amounts from a water main 32 by way of branches 33 controlled by valves 34. It is also preferable to vacuumize the chambers and conduits to remove any air that may be entrapped in the mix by connecting each chamber with a vacuum main 35 by way of branches 36 controlled by valves 37.

Although it is preferred that the slip forming operation be continuous as the material flows constantly through its respective blunger, it is contemplated that this operation could be intermittent in timed relation with interrupted flow of the material, whereby the slips would be formed in batches.

The various materials are forced through their respective conduits 14a from the bins into the blungers by means of a suitable measuring and progressing means such as either an auger or a reciprocating ram 38 associated with each conduit and in front of which, on its return stroke, the material is fed by gravity or otherwise from the bottom end outlet 39 of its respective bin. (See Fig. 3.) The range and frequency of reciprocation of the ram or progressing capacity of an auger, if employed, may be varied by suitable means to control the amount of material to be fed in a given time. To this end (see Fig. 3) each ram may be operated by a piston-and-cylinder fluid motor 40 whose piston rod 41 extends through bearings in end walls of the cylinder with adjustable stop collars 42 thereon for cooperating with the bearings respectively to regulate the range and/or travel termination positions of the ram. Each fluid motor may be periodically energized from a main fluid pressure line 43 by way of a four-way valve 44 operated by suitable timing means, and conduits 45 leading therefrom to the opposite ends of the cylinder of the motor.

The system also includes a series of primary clay body preparing blungers 48, 49 and 50 into either one or a number of which various amounts of any material or materials contained in the chambers 22 to 27 of the blungers 15 to 20 may be conducted in preparing for example, three predetermined clay body compositions or methods of conditioning having differing characteristics suitable for various ware producing methods, such as are known as the dry press method, plastic method and the slip casting method. The material is conducted from the chambers of each blunger 15 to 20 by way of inlet branches 51 of a conduit 52, a suitable pump 53 therein and outlet branches 54 thereof leading to headers 55 connected with the receiving ends of the clay body blungers. In each inlet conduit branch 51 is a valve 56 to enable selection and flow control of the various materials in various conditions, and in each outlet branch 54 is a valve 57 to enable selection and flow control of the desired material into a selected clay body blunger or number of same.

Interposed in each conduit 52 between the pump 53 therein and the inlets thereof, may be a conventional enclosed screen 60 for screening the material and an enclosed conventional magnet device 61 for removing any minute iron particles that may be contained in the material before it is pumped into the clay body blungers.

The discharge outlet of each clay body blunger may be in supplying connection with a number of different types of clay body treatment and/or feeding apparatus for various ware production methods, by way of a conduit 62 leading therefrom through which the clay body is forced by a suitable pump 63 and directed by conduit branches 64 into headers 65, 66, 67 and 68 for supplying the various apparatus, with a valve 69 in each branch to enable selection of the header or headers to be supplied and the amount or rate of flow of the clay body desired.

Each blunger 48 to 50 is in supplying connection with a pair of secondary clay-body blungers or blenders 70 and 71 by way of the supply conduit 62 of each blunger and branches 72 thereof controlled by valves 73, whereby various clay body compositions constituting variations of the clay compositions in said blungers may be blended in said blenders and supplied to any of the headers 65 to 68 by way of a discharge conduit 74 of each blender, a pump 75 therein and branches 76 of the conduit controlled by valves 77. Another clay-body composition constituting a blended variation of the compositions produced in the blenders 70 and 71 may be prepared in a tertiary blender 78 which is in supplied connection therewith through branches 79 of the conduits 74 and controlled by valves 80, the blender 78 being in supplying connection with the headers 67 by way of a conduit 81, a pump 82 therein and conduit branches 83 controlled by valves 84 to enable selection of the header to be supplied.

The primary, secondary and tertiary blungers or blenders are of the enclosed type wherein the mixing operation is accomplished by suitable means, for example, like that employed in the blungers 15 to 20, with each having a single chamber vacuumized by communicating with the vacuum line 35 by way of a branch 86 controlled by a valve 87, to remove any air or gases that may be entrapped in or may evolve from the clay compositions.

If desired, interposed in each supplying conduit 62, 74 and 81 of the blungers or blenders, may be a magnet device 90 and a screen or lawn apparatus 91 of the enclosed types to further insure the removal from the compositions of iron and other undesirable coarse particles in further determining the purity and texture of a certain clay composition. A bypass 92 and valves 93 and 94 enable selective employment of these auxiliary cleaners.

For a clear understanding as to the use or uses to which the system may be put, the supplying header 65 may supply a thin clay slip derived from any one of the clay body blungers or blenders as for instance the blunger 48, to a desiccator 98 by way of a valved conduit 99 for dehydrating the slip to form a dry or semi-dried clay powder for dry press ware producing methods. This desiccator may supply a bagging machine, a storage bin, or a feeder for fabricating apparatus.

The header 66 may supply slip derived from the blunger 49 or one of the blenders, to an ordinary continuous filter 100 by way of a valve conduit 101, then progressed through a pug mill 102 for further conditioning the clay for use in the production of pressed or jiggered pottery ware. This pug mill 102 may be of a type for producing clap slugs, or it may directly supply a clay feeder or a series of same, in connection with a single or multiple line production apparatus, by way of a manifold as described in my co-pending application Serial No. 421,299.

The header 67 may supply a certain clay body in slip form derived from any of the blenders of the clay bodies in blungers 48 and 49 to a desiccator 103 by way of a valved branch 104, which in turn supplies the desiccated dry or semi-dried clay body directly to a feeder 105 by way of the conduit 106 or other suitable clay conducting means. This header may supply a spray feeder nozzle 107 or a number of same by way of another valved branch 108 for a spray method of ware production, and it may supply through a valved conduit 109 a desiccating type of clay feeder 110 for feeding desiccated clay directly on the molds of fabricating apparatus, as defined in my Patent No. 2,270,075.

The header 68 may supply a clay slip of another composition, derived from one of the blungers or blenders suitable for slip casting methods, to a casting feeder, an appendaging feeder, an engobing feeder and any other type of slip feeder, by way of the valved branches 111, 112, 113 and 114.

It is also contemplated that suitable means may be provided at various points of the system for the removal of desired amounts of material or clay bodies for test purposes as adjustments are made to change or modify a certain condition of a material or materials or to change or modify a clay composition or compositions to insure the proper result or results while the system is in operation so as not to interrupt the functioning of the fabricating system or systems supplied thereby. Said means may comprise suitable valved outlets at such various points, as indicated at 115.

As seen in Fig. 5, the scrap clay salvaged from the various ware fabricating apparatus fed by the headers 65 to 68 may be reconditioned and returned to the various blungers or blenders from which it was derived by way of a conveyor 118 for the scrap clay of each particular composition, a scrap clay reconditioning blunger or mixer 119 into which the scrap clay is fed by the conveyor to be mixed with water supplied by a line 120, and from which mixer the slip is pumped by a pump 121 through a conduit 122 connected with headers 122a of the blungers by branches 123 controlled by valves 124 to enable selection of the blunger to be supplied. In each conduit 122, a screen 125 and magnet device 126 of enclosed types may be interposed for removing iron particles and undesirable coarse material from the slip. It is also contemplated that the scrap clay of various bodies may thus be utilized to change or modify the clay bodies being prepared in the various blungers, by virtue of the manner in which the dispositioning of the scrap clay may be controlled.

The desiccator 98 (see Fig. 6) may comprise a sealed upwardly tapered conical shell 130 having a top end inlet port 131 into which a drying medium, such as hot dry air, is admitted through a conduit 132 controlled by a valve 133 and connected with a suitable hot air source, as for instance that adjacent a kiln and further heated by any type of a heating device 131a, such as an electric heating coil interposed in said conduit. Near the top of the shell and directed axially downward therein is an atomizer 134 supplied by the conduit 99 to atomize the clay slip, whereupon it falls downward in the shell coincident with dehydration by the drying medium. To control the moisture content of the resulting precipitated clay, hot dry air may be directed into the shell and withdrawn at various elevations and in various directions through annular series of peripheral ports 134 in the shell connecting with manifolds 135 supplied from the conduit 132 by branches 136 controlled by valves 137. Thus chilling of the air through evaporation may be delayed or expedited in controlling the dehydrating operation. The spent air is evacuated through an annular series of ports 138 in the shell connected with a manifold 139 exhausted by a suction pump 140. As the optimum dehydrated material or clay powder, falls onto the bottom wall 141 of the shell it is directed by a rotating deflector 142 through a side outlet 143 and into the receiving end 144 of a conduit 145 through which it is forcefully advanced to a desired destination or destinations by, for example, an auger or a reciprocating ram 146 actuated by any suitable means such as a fluid piston-and-cylinder motor 147 similar to the motor 40.

The deflector 142 may constitute an arcuate blade mounted on a central shaft 148 in the shell and driven by a motor 149 through reducing gearing 150. On the shaft 148 may also be secured an elongated scraper 151 engaging a considerable portion of the inner vertical wall of the shell to remove any of the dehydrated material therefrom that may accumulate thereon.

As the clay slip is conducted to the nozzle 134 under pressure it is heated preferably above the boiling point. Then upon atomization and lowering of pressure the slip boils and expells vapor which is picked up and carried away by the hot air. The shell may be vacuumized, to expedite dehydration and prevent air-entrapment in the conditioned clay, by having connection with the vacuum line 35 through a branch 152 controlled by a valve 153.

In that some clay slips give the best results during treatment under various temperatures, it is preferred to so heat the various slips as they pass through the system by incorporating in each blunger, blender or mixer, a thermo-controlled heater 154, and interposing an enclosed thermo-controlled heater 155 in each of the conduits through which the material slips and clay slips are conducted (see Figs. 1 and 2). These heaters may be of the electric type controlled by a thermo-responsive element 156 so arranged to be responsive to the temperature of the slip heated by its respective heater (see Fig. 4).

For the purpose of increasing fluidity of a certain clay slip without adding water, as is most desirable in some instances, the fluidity of the slips being treated in the clay preparation blungers or blenders may be controlled by adding thereto an anhydrous fluidifying medium, or electrolyte, such as soda ash or silicate of soda, supplied by an adjustable delivery feeder from tanks 157 connected with said blungers or blenders respectively through conduits 158, each controlled by a suitable valve 159.

While it may be desirable in some installations of the system to effect the flow of the material therethrough by means of pumps, it is contemplated that the flow may be effected by force of gravity by arranging the various apparatus of the system accordingly so that an optimum degree, downward course of the fluid may be maintained throughout the system.

The invention also contemplates means for minimizing or avoiding waste of clay being fed by the feeder headers 65 to 68 or any one thereof while adjustments are being made to correct, alter, or otherwise change the clay body composition or compositions to that desired during the clay preparation operation. For this purpose, as shown in Figs. 1 and 2, each header may be connected in controlled supplying connection with each of the blungers 48 to 50, 70, 71 and 78 by a conduit 160, a pump 161 therein, conduit branches 162 controlled by valves 163, and a main valve 164 in the conduit 160 between the header and pump. Thus any clay body that may be otherwise discarded from the headers may be returned to the particular blunger from which it was derived for further treatment until the composition is optimum while adjustments are made and while the outlet of the particular header is closed. Also by adjusting the valves 163 and 164 various desired proportions of clay in any one of the headers may be deflected back to any one of the blungers to further serve in securing desired blended clay bodies, or directed back to the blunger from which it was derived to further control the flow of clay from the header in accordance with the demand of the apparatus fed thereby.

By virtue of the manner in which the various material and clay slips may be controlled in the system for clay preparation, blending, etc., while progressing continuously therethrough has made possible the expeditious creation of a multiple of predetermined clay compositions, simultaneously conditioned for state of hydration, dehydration, plasticity or fluidity in accordance with the ware producing methods for which the compositions are intended, and wherein the possibility of air entrapment in the compositions or the contamination thereof by foreign matter harmful to the behavior of the clay during treatment, fabrication, drying or firing is avoided.

The system also expedites the mixing and blending of the various slips to a much greater extent than is made possible by the ordinary single batch forming methods, for the reason that two or more compatible materials may be thoroughly mixed while another compatible mixture is being prepared and then gradually mixing same with the aforesaid mixture to form the desired composition under absolute control as to proportioning of the materials or slips concerned, the mixing phase, the rates of continuous flow and the proper temperatures thereof that will give the best results. On the other hand, certain two or more materials may be compatible, but if an additional material or mix is incorporated therewith before mixing or blending, experience has indicated that the operation is usually retarded or rendered inefficient.

Having thus described my invention, I claim:

1. A clay body preparation system including sources of supply of the various materials for the body, a plurality of clay body supplying devices, means for drawing off predetermined amounts of the materials from selected sources, means for preparing same to form clay bodies of various proportions of the materials and means for selectively conducting the bodies therefrom to said devices respectively.

2. A clay body preparation system including sources of supply of the various materials for the body, a plurality of clay body supplying devices, means for drawing off predetermined amounts of the materials from the sources, means for preparing same to form clay bodies of selected different compositions of the materials including at least a clay body constituting a selected mixture of other bodies and means for conducting said bodies therefrom to said supplying devices respectively.

3. A system for preparing clay bodies for pottery ware manufacture including a plurality of sources of supply of the various materials required, a clay body supplying device, enclosed means for selectively drawing off predetermined proportions of the various materials from said sources, means for mixing same separately with predetermined portions of water to form a slip of each, means for mixing predetermined portions of selected slips of the various materials to form the clay body and means for conducting same to the supplying device.

4. A system for preparing clay bodies for pottery ware manufacture including a plurality of sources of supply of the various materials required, a number of clay body supplying devices, enclosed means for selectively drawing off predetermined proportions of the various materials from said sources, means for mixing same separately with given proportions of water to form a slip, means mixing predetermined portions of selected slips of the various materials to form a number of clay bodies of different mixtures of the materials, means for mixing predetermined portions of selected bodies to form a blended combination clay body of said bodies and means for conducting each clay body to a selected supplying device.

5. Means for preparing clay bodies for pottery ware manufacture made up of a plurality of materials, comprising a feeder for each material, a plurality of clay body mixing devices, a plurality of clay body suppliers, conduit means connecting each of the material feeders with each device and connecting each device with each clay body supplier, and flow control means arranged in the conduit means connecting the devices with the material feeders and clay body suppliers.

6. In combination in means for preparing clay bodies for pottery ware manufacture made up of a plurality of materials, comprising a plurality of devices having controllable means for mixing clay bodies of various compositions of the materials including controllable means interconnecting said devices to divert predetermined portions of the clay bodies from one device to the other.

7. Apparatus for making clay slip and delivering the same to a plurality of receivers which comprises, a plurality of primary blungers; primary, secondary and tertiary blenders, conduits connecting said blungers and primary blenders, filtering devices in each conduit, conduits connecting said primary, secondary and tertiary blenders, discharge pipes connecting all of said blenders to said receivers and flow-control means in some of said conduits operable to vary the amount and kind of blunged material delivered to said blenders to thereby enable simultaneous preparation of mixtures whose formulae vary.

8. Apparatus for making clay slip and delivering same to a plurality of receivers which comprises a plurality of primary blungers; primary, secondary and tertiary blenders, conduits connecting said blungers and said primary blenders, filtering means associated with said conduits, conduits connecting said primary, secondary and tertiary blenders and said receivers, flow-control means in some of said conduits operable to govern the discharge of material from one blender to another and means for supplying said primary blungers with raw materials comprising a periodically operating feeder for delivering proportional amounts of material to said blungers and a conduit connecting said blungers and said feeders.

9. In apparatus for class described, a plurality of blungers each having a plurality of mixing chambers, a bin for raw materials associated with each blunger, power-actuated means for delivering predetermined quantities of raw materials at periodic intervals to one of the mixing chambers; primary, secondary and tertiary blenders, conduits connecting each blunger with all of said primary blenders through which blunged materials are conducted thereto, means associated with each conduit for regulating the flow of blunged material therethrough, conduits connecting said primary blenders with said secondary and tertiary blenders, means associated with said last named conduits for regulating the flow therethrough, a plurality of receivers for blunged, blended materials, conduits connecting all of said blenders therewith, means for regulating the flow of blended materials therethrough, and means for applying vacuum to the blungers and blenders.

10. In apparatus of the class described, a plurality of blungers; primary, secondary and tertiary blenders, a plurality of receivers for blunged and blended materials, pipes connecting the blungers with the primary blenders, means for filtering the blunged material in said pipes, pipes connecting said primary blenders with the secondary and tertiary blenders and said receivers, means for filtering blended material in said last named pipes, and flow-control means associated with some of said pipes whereby materials entering the blenders may be proportioned and varied to enable the compounding simultaneously of several slips that vary in formula according to the requirements of the several receivers.

11. In apparatus of the class described, a plurality of blungers, primary, secondary and tertiary blenders, a plurality of receivers for blunged blended material, means for conducting the output of any one of the blungers to all of the primary blenders, means for conducting the output of the primary and secondary blenders direct to the receivers or to the tertiary blender, means for conducting the output of the tertiary blender to all of said receivers, means for regulating the flow of blended material from any one of the blenders to the receivers and between blenders thereby to enable the simultaneous compounding of a plurality of slips from the blunged material and the selective variation of the ingredients of which the various slips are composed.

12. In apparatus of the class described, a plurality of blungers, each having primary, secondary and tertiary blunging chambers, primary, secondary and tertiary blending chambers, a plurality of receivers for blunged, blended materials, means for supplying said blungers with raw materials, pipes for conducting the output of said blungers from either the primary, secondary or tertiary blunging chambers to any one of said blenders, pipes connecting said primary blenders with said secondary and tertiary blenders and with said receivers, means for controlling the flow of material between the blungers and blenders, and between the blenders and receivers, means for supplying fluid to all of said blungers and blenders, means for vacuumizing the blunging and blending chambers and means for filtering the material in the blunged and the blended stages.

13. In apparatus of the class described, a desiccator for drying clay slip, a filter for removing liquid constituents from clay slip, a nozzle through which clay slip is discharged for casting purposes, a header having a pipe connection with the desiccator, a header having a pipe connection with the filter, a header having a pipe connection with the nozzle, a plurality of conduits connected to each header leading back to inlets, blungers for supplying different mixtures of clay slips to each inlet and flow control means in each conduit whereby the feeding of slip into any one of the headers may be changed from one blunger to another.

14. A clay body preparation system including sources of supply of the various materials from which the body is made, a plurality of clay body supplying devices, means for draining off predetermined amounts of the materials from selected sources, means for mixing the same with water under vacuum to form clay slips of various proportions of the materials and means for selectively conducting the slips therefrom to said devices respectively.

15. Apparatus of the class described, a desiccator for drying clay slip, a filter for removing liquid constituents from the clay slip, clay feeding means for supplying clay to fabricating stations, a header having a pipe connection associated with the desiccator, a header having a pipe connection associated with the filter, a header having a pipe connection with the feeder, a plurality of conduits connected to each header leading back to inlets, blungers for supplying different mixtures of clay slips to each inlet and flow control means in each conduit whereby the feeding of slip into any one of the headers may be changed from one blunger to another.

WILLIAM J. MILLER